United States Patent [19]
Korbel et al.

[11] 3,907,137
[45] Sept. 23, 1975

[54] SHOCK ABSORBING CONNECTION BETWEEN A GRAPPLE AND A WINCH LINE

[75] Inventors: Adrian Charles Korbel; Victor Charles Pierrot, III, both of Dubuque, Iowa

[73] Assignee: Deere & Company, Moline, Ill.

[22] Filed: Oct. 16, 1974

[21] Appl. No.: 515,294

[52] U.S. Cl............... 214/147 R; 214/143; 214/657; 214/DIG. 6
[51] Int. Cl.² .......................................... B66C 1/42
[58] Field of Search....... 214/147 R, 147 G, DIG. 6, 214/657, 143; 212/35 HC, 9; 254/198

[56] References Cited
UNITED STATES PATENTS

| | | | |
|---|---|---|---|
| 2,350,641 | 6/1944 | Ruddock | 214/DIG. 6 X |
| 2,712,919 | 7/1955 | Calvert | 214/657 X |
| 3,746,193 | 7/1973 | Eaves | 214/147 G X |

*Primary Examiner*—Frank E. Werner

[57] ABSTRACT

The winch line of a grapple skidder is connected to one end of an extensible shock absorber assembly forming part of a grapple that is suspended from the rear end of a boom mounted on the skidder. The shock absorber includes a compression spring assembly which becomes compressed in the event that the winch is operated after the grapple is brought up against the rear end of the skidder, the shock absorber assembly thus preventing damage to the grapple and/or the winch line.

6 Claims, 3 Drawing Figures

SHOCK ABSORBING CONNECTION BETWEEN A GRAPPLE AND A WINCH LINE

BACKGROUND OF THE INVENTION

The present invention relates to a grapple skidder and more particularly relates to a connection between a grapple and winch line of the skidder.

Grapple skidders normally include a grapple universally connected to the rear end of a boom structure mounted on the rear section of the grapple skidder. Due to the fact that the grapple is freely swingable when it is not in use, it is common practice to attach a winch line of the grapple skidder to the grapple and to winch the grapple against the rear end of the grapple skidder in order to prevent the grapple from flopping into pounding engagement with the grapple skidder during transport.

The above practice of winching in the grapple has the disadvantage that the grapple and/or the winch line may be damaged if the winch continues to be operated once the grapple is tight against the rear end of the grapple skidder.

SUMMARY OF THE INVENTION

According to the present invention, there is provided a novel connection between a grapple and a winch line.

A broad object of the invention is to provide a grapple with a yieldable shock absorbing connection for attachment to a winch line, the connection acting to absorb loads incurred due to the operator continuing winching action after the grapple is snubbed against the rear of the grapple skidder.

A more specific object is to provide a grapple embodying a shock absorber mechanism comprising a normally fore-and-aft extending cylindrical tubular member having a closed front end and containing a coil compression spring assembly having a rod disposed therethrough and projecting through the closed front end of the tubular member, the rod having an abutment at its rear end engaged with the rear end of the spring and having a coupling at its forward end engaged with the front end of the tubular member and adapted for connection to a winch line whereby forces imposed on the grapple by the winch line will have to pass through the coil compression spring assembly.

These and other objects will become apparent from a reading of the following description taken together with the appended drawing.

DESCRIPTION OF THE PREFERRED EMBODIMENT

Figure 1:
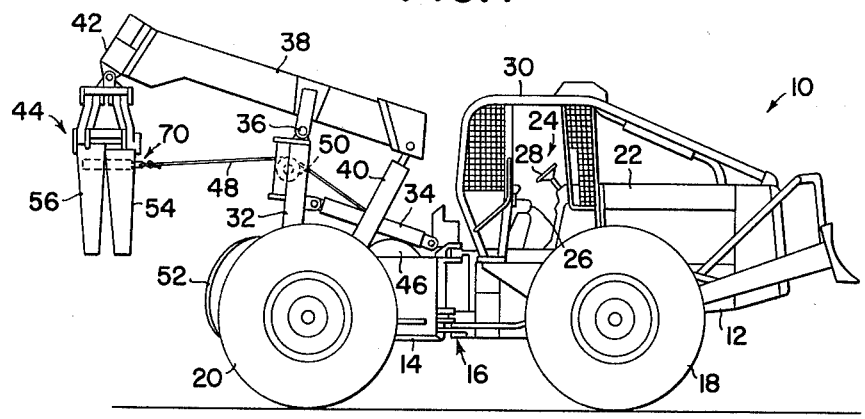
FIG. 1 is an elevational view of the right side of a grapple skidder embodying a grapple constructed according to the principles of the present invention.
Figure 3:
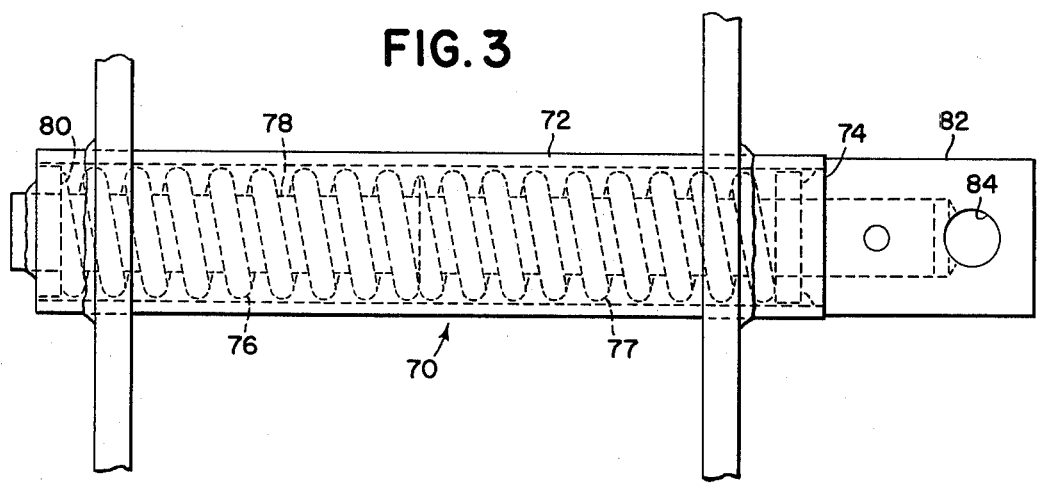
FIG. 3 is a top plan view of the shock absorber assembly of the present invention showing details of its connection with the grapple shown in FIG. 2.

Referring now to FIG. 1, therein is shown a forestry vehicle commonly known as a grapple skidder and indicated in its entirety by the reference numeral 10. The grapple skidder 10 includes a main frame comprising front and rear frame sections 12 and 14, respectively, interconnected by a vertical pivot assembly 16 and respectively supported on front and rear pairs of driven ground wheels 18 and 20, respectively (only one of each pair of ground wheels being shown).

The front frame section 12 supports an engine (not shown) contained within the usual engine enclosure 22 behind which is located an operator's station 24. Mounted on the floor of the operator's station 24 is a seat 26 and located so as to be within easy reach of a seated operator are various controls of which only a steering wheel 28 is shown. A protective structure 30 bounds the operator's station 24.

A grapple boom structure is supported on the rear frame section 14 and is here illustrated as a type including a first boom section 32 having its lower end pivotally connected to a rear portion of the frame section 14 by means defining a horizontal transverse pivot axis about which the boom section 32 is selectively swingable through means of one or more extensible and retractable hydraulic actuators 34 having opposite ends respectively pivotally connected to the boom section 32 and the frame 14. The upper end of the first boom section 32 is pivotally connected, as at 36, to a fore-and-aft extending second boom section 38 at a location intermediate the front and rear ends of the latter. The pivot connection 36 defines a horizontal transverse pivot about which the second boom section is selectively swingable through means of one or more extensible and retractable hydraulic actuators 40 connected between a forward end portion of the boom section 38 and the frame section 14. A conventional rotary joint 42 is fixed to the rear end of the boom section 38 and a grapple 44 is suspended from a downwardly projecting output shaft of the rotary joint 42.

Also mounted on the rear frame section 14 is a winch 46 having a length of winch line or cable 48 wrapped thereabout, the winch line having a rearwardly extending portion trained over a horizontally disposed roller 50 rotatably mounted in a top portion of the first boom section 32. The rear end of the line 48 is coupled to the grapple 44, in a manner to be presently described, whereby operation of the winch will cause the grapple 44 to be swung snugly against a butt pan 52 forming the rear end of the rear frame section 14, it being noted that the grapple 44 will be properly positioned for being swung against the butt pan 52 upon extension of the hydraulic actuator 34 from its retracted position illustrated in FIG. 1 so as to effect lowering of the grapple 44 by counterclockwise swinging of the second boom section 38 about the pivot connection 36.

Figure 2:
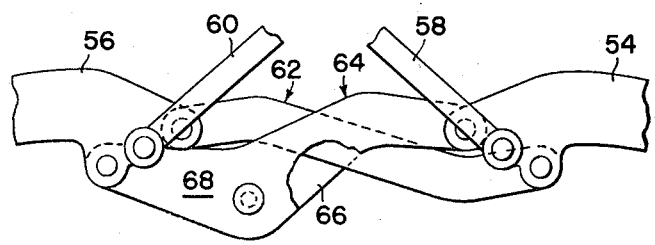
FIG. 2 is a partial front elevational view of the grapple of the present invention.

While the grapple 44 could be of any desired construction, the grapple illustrated here includes right and left grapple arms 54 and 56, respectively, (FIG. 2) having right and left suspension link assemblies 58 and 60, respectively, connected to upper end portions thereof, it being noted that the link assemblies 58 and 60 each comprise a pair of fore-and-aft aligned links. Also connected to upper end portions of the grapple arms 54 and 56 are cross link assemblies 62 and 64 which are disposed for effecting symmetrical movement of the grapple arms 54 and 56 in a manner well known in the art. Like the suspension link assemblies 58 and 60, the cross link assemblies 62 and 64 are also comprised of fore-and-aft aligned pair of links with reference numerals 66 and 68 being respectively applied to front and rear links of the cross link assembly 64 for easy identification in the description to follow.

Secured to the cross link assembly 64 and forming an integral part of the grapple 44 is a shock absorber mechanism designated in its entirety by the reference numeral 70. The shock absorber mechanism 70 includes a cylindrical tubular member 72 which extends through the links 66 and 68 of the cross link assembly 64 in crosswise relationship thereto and is fixed thereto, as by weldments. As viewed in FIG. 1, the tubular member 72 has a closed front end 74 and a pair of coil compression springs 76 and 77 are disposed in end-to-end engagement within the tubular member 72, the spring 77 having its forward end engaged with the closed end 74. A rod 78 extends centrally through the springs 76 and 77 and carries an abutment 80 at its rear end which is dimensioned for slidable movement in the tubular member 72 and engages the rear end of the spring 76. Pinned to the forward end of the rod 78 is a cap-like connector 82 which normally abuts the forward end of the tubular member 72. The connector 82 includes a cross hole 84 which may receive a clevis bolt or any other type of connecting bolt for securing the winch line 48 to the grapple 44.

The operation of the shock absorber mechanism 70 is briefly described as follows. Assuming that the grapple skidder 10 is being driven to or from an area whereat skidding operation is to be or has been performed, the grapple will be moved to a transport position by first positioning it as close as possible to the butt pan 52 by operation of the actuators 34 and 40. The winch 46 is then operated to cause the grapple 44 to be drawn up against the butt pan 52 at the rear end of the tractor. In the event that the operator should continue to winch in the line 48 after the grapple 44 has become snug against the butt pan 52, the force of the winch pulling in the line 48 will be transferred to the compression springs 76 and 77 through means of the abutment 80 carried by the rod 78 and the springs 76 and 77 will be compressed as the line 48 is winched in. Thus the springs 76 and 77 permit the winch line 48 to be over-traveled a distance equal to twice the distance between adjacent coils of the springs without imparting damaging loads to the grapple 44.

We claim:

1. In the combination of a grapple skidder having a main frame provided with an abutment surface at the rear end thereof, and elevating boom means mounted on the main frame for vertical movement relative thereto and including a free end positionable rearwardly of the frame, a grapple means swingably suspended from the free end of the boom means and being of a type including a pair of grapple tongs interconnected adjacent respective upper end portions thereof by at least one link means extending therebetween and having opposite ends pivotally connected thereto, a winch mounted on the frame and having a cable operatively secured thereto and extending rearwardly therefrom; connection means securing the cable to said link means, the improvement comprising: said connection means including deflectable shock absorber means for absorbing a predetermined load exerted on said connection means by said winch acting through said cable as when the grapple means is winched against said abutment surface to stabilize the grapple means during transport.

2. The grapple skidder defined in claim 1 wherein said connection means includes a tubular member fixed to said link means so as to extend crosswise to the length thereof; a rod extending axially into said tubular member and having an end connected to said cable; coil compression spring means encircling said rod and positioned between first and second abutments, respectively, fixed to said rod and tubular member; whereby tensile forces exerted on said cable will act against the force of the spring means and cause the latter to be compressed between said first and second abutments when a predetermined tensile force is reached.

3. The grapple skidder defined in claim 2 wherein said link means includes a pair of parallel spaced link members, and said tubular member extending through and being secured to both link members.

4. The grapple skidder defined in claim 2 wherein the cable is connected to said rod by means including a tubular cap having the end of the rod received therein, fastener means securing the rod and cap together; and said cap being dimensioned such that it will not enter said tubular member.

5. A grapple skidder for elongate loads including a vehicle having a main frame, load handling and skidding means carried by the vehicle and including elevating means, grapple means swingably suspended from the elevating means, said elevating means and grapple means being capable of elevating the leading end of an elongate load; a butt pan means on the rear end of the main frame; winch means on the main frame, a cable leading from the winch means and means releasably securing the cable to said grapple means whereby the latter may be pulled up against said butt pan to a transport position by actuation of said winch, the improvement conmprising: said means releasably securing the cable to said grapple means including yieldable shock absorber means for absorbing a predetermined load exerted on said cable by the winch means in excess of that required to snugly engage the grapple means with said butt pan.

6. Apparatus for use in handling logs and the like including a vehicle frame having an abutment surface means at the rear end thereof, a load elevating boom means mounted on the frame for vertical movement reltive thereto and including a free end positionable therebehind, universal joint connection means supported on the free end of said boom means, grapple means connected to the universal joint means and including a pair of elongate grapple arm means, a first pair of link means respectively having first ends pivotally connected to the universal joint connection means and having second ends respectively pivotally connected to said pair of arm means by connection means defining a first pair of pivot axes respectively spaced downwardly from respective upper ends of the arm means, an extensible and retractable cylinder means having opposite ends respectively pivotally connected to the upper ends of said arm means by connection means defining a second pair of pivot axes, the motor being operative for causing respective movement of the pair of arm means about said first pair of axes, second and third link means cross-connected between the arm means in such relationship to the first and second pair of axes that the grapple arm means are constrained to move symmetrically in response to actuation of said motor means, a winch means mounted on the frame, a cable leading rearwardly from the winch means, connection means securing an end of the cable to one of said second and third link means, the improvement comprising: said lastmenioned connection means including yieldable shock absorbing means for absorbing a predetermined load exerted on the connection means by the winch means acting through the cable means as when the grapple means is winched forwardly against the abutment surface at the rear end of the frame.

* * * * *